(12) United States Patent
Jakobsson et al.

(10) Patent No.: US 7,404,078 B2
(45) Date of Patent: Jul. 22, 2008

(54) METHODS AND APPARATUS FOR PRIVATE CERTIFICATES IN PUBLIC KEY CRYPTOGRAPHY

(75) Inventors: Bjorn Markus Jakobsson, Hoboken, NJ (US); Phong Q. Nguyen, Paris (FR)

(73) Assignee: Lucent Technologies, Murray Hill, NJ (US)

( * ) Notice: Subject to any disclaimer, the term of this patent is extended or adjusted under 35 U.S.C. 154(b) by 863 days.

(21) Appl. No.: 10/180,786

(22) Filed: Jun. 26, 2002

(65) Prior Publication Data

US 2004/0003236 A1 Jan. 1, 2004

(51) Int. Cl.
*H04L 9/30* (2006.01)
(52) U.S. Cl. .................. 713/157; 713/156; 380/279
(58) Field of Classification Search .......... 713/157
See application file for complete search history.

(56) References Cited

U.S. PATENT DOCUMENTS

| | | | | |
|---|---|---|---|---|
| 5,796,833 | A * | 8/1998 | Chen et al. | 713/156 |
| 6,477,254 | B1 * | 11/2002 | Miyazaki et al. | 380/286 |
| 6,615,347 | B1 * | 9/2003 | de Silva et al. | 713/156 |
| 2002/0038420 | A1 * | 3/2002 | Collins et al. | 713/156 |

FOREIGN PATENT DOCUMENTS

CA 2317213 A1 * 3/2002

OTHER PUBLICATIONS

Menezes et al. Handbook of Applied Cryptography 1997 CRC Press pp. 559-561.*
Oded Goldreich, Birgit Ptzmann, and Ronald L. Rivest. Self-delegation with controlled propagation—or—what if you lose your laptop. In Advances in Cryptology|CRYPTO 98, pp. 153-168. Springer-Verlag, 1998.*
S. Brands, "Untraceable Off-Line Cash in Wallet with Observers," Springer-Verlag, pp. 302-318, 1998.
O. Goldreich et al., "Self-Delegation with Controlled Propagation—or—What if You Lose Your Laptop," Proc. of Crypto '98, vol. 1462 of LNCS, IACR, Springer-Verlag, pp. 0-18, 1998.

* cited by examiner

*Primary Examiner*—Emmanuel L Moise
*Assistant Examiner*—David J Pearson
(74) *Attorney, Agent, or Firm*—Kenneth M. Brown

(57) ABSTRACT

Private certificates designed to counteract problems associated with certificate lending are configured such that disclosure of a secret key associated with one certificate automatically results in disclosure of a secret key associated with another certificate, while the corresponding public keys are unlinkable with one another. In an illustrative private certificate generation protocol, a user generates verification information associated with a first public key. The verification information is generated at least in part using a corresponding first secret key. The verification information is supplied to a certification authority, which generates based at least in part on the first public key and the verification information a second public key having a corresponding second secret key, and generates a certificate based at least in part on the second public key. The private certificate generation protocol may be asymmetric or symmetric.

17 Claims, 3 Drawing Sheets

METHODS AND APPARATUS FOR PRIVATE CERTIFICATES IN PUBLIC KEY CRYPTOGRAPHY

FIELD OF THE INVENTION

The invention relates generally to the field of cryptography, and more particularly to techniques for generating certificates for use in secure communication and other cryptographic applications.

BACKGROUND OF THE INVENTION

As is well known, certificates play an essential role in public key cryptography. For example, public key certificates allow public keys to be communicated over unsecured media without danger of undetectable manipulation, thereby ensuring that public key authenticity and validity remain verifiable. Public key certificates are described in, e.g., A. J. Menezes et al., "Handbook of Applied Cryptography," CRC Press, 1997, which is incorporated by reference herein. A public key certificate typically includes a data part and a signature part. The data part, which is in plaintext form, generally includes at a minimum the public key and a corresponding subject entity identifier, and may include additional information such as specified access rights. The signature part comprises a digital signature of a trusted certification authority (CA) on the data part. By its signature on the data part, the CA vouches for the authenticity of the public key bound to the subject entity. The public key certificate may thus be viewed as assigning an identity as well as specified access rights to the holder of the associated secret key. Such certificates are useful in many applications, including providing secure access to accounts, subscription-based services, and other types of restricted information, and controlling signatory authority for documents.

A significant problem with conventional certificate generation techniques is that the resulting certificates are not secure against "certificate lending." This refers to a situation in which a certificate holder voluntarily shares with others the rights bestowed upon that holder through the certificate. This type of abuse is of particular concern for several types of applications, such as those involving digital rights management. Moreover, if a given user has multiple secret keys each having a corresponding certificate, it is generally the case that if the user shares a particular one of the certificates with other users, it does not adversely impact any other certificates held by the given user. This feature of conventional certificate techniques tends to encourage certificate lending, thereby aggravating the problem.

A need therefore exists for improved techniques for generating certificates, such that the above-noted certificate lending problem can be alleviated.

SUMMARY OF THE INVENTION

The present invention meets the above-identified need by providing improved certificates referred to herein as "private certificates."

In accordance with one aspect of the invention, private certificates designed to counteract the certificate lending problem are configured such that disclosure of a secret key associated with one certificate automatically results in disclosure of a secret key associated with another certificate, while the corresponding public keys are unlinkable with one another.

In an illustrative private certificate generation protocol, a user generates verification information associated with a first public key. The verification information is generated at least in part using a corresponding first secret key. The verification information is supplied to a certification authority, which generates based at least in part on the first public key and the verification information a second public key having a corresponding second secret key, and generates a certificate based at least in part on the second public key.

In another illustrative private certificate generation protocol, a certification authority receives information associated with a first certificate, the first certificate being based at least in part on a first public key having a corresponding first secret key. The certification authority generates from the received information at least one additional certificate related to the first certificate but having associated therewith a second public key that is not correlatable to the first public key associated with the first certificate. Moreover, the additional certificate is generated such that a second secret key associated with the at least one additional certificate is determinable from the first secret key associated with the first certificate.

A private certificate generation protocol in accordance with the invention may be out-asymmetric, in-asymmetric or symmetric. In an out-asymmetric protocol, the second secret key can be determined from the first secret key but the first secret key cannot be determined from the second secret key. In an in-asymmetric protocol, the first secret key can be determined from the second secret key but the second secret key cannot be determined from the first secret key. In a symmetric protocol, the second secret key can be determined from the first secret key and the first secret key can be determined from the second secret key. The invention can also be implemented in the form of a private certificate generation protocol in which a certain set of secret keys has to be known in order to compute another set of secret keys, and this type of protocol could be either symmetric or asymmetric.

DETAILED DESCRIPTION OF THE INVENTION

The present invention will be illustrated below in conjunction with an information processing system in which the private certificate techniques of the invention are implemented over the Internet or other type of network or communication channel. It should be understood, however, that the invention is more generally applicable to any type of electronic system or device application in which it is desirable to provide the described private certificate functionality to users. For example, although particularly well suited for use with computer communications over the Internet or other computer networks, the invention can also be applied to numerous other information processing applications, including applications involving information transmission over wireless networks using wireless devices such as mobile telephones or personal digital assistants (PDAs).

Figure 1:
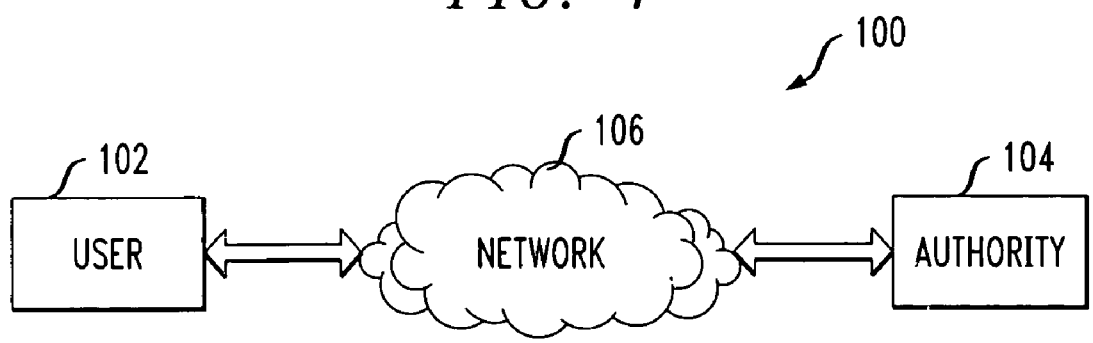
FIG. 1 shows an illustrative embodiment of an information processing system in which the present invention is implemented.

FIG. 1 shows an exemplary system 100 in which the private certificate techniques of the invention are implemented. The system 100 includes a user 102 which communicates with a certification authority 104 over a network 106. The user 102 may represent one or more client devices, such as desktop or portable personal computers, mobile telephones, PDAs, television set-top boxes or any other types of devices capable of transmitting or receiving information over network 106. The certification authority 104 may be implemented as or otherwise comprise one or more servers or other processing devices, each coupled to the network 106. Numerous other device configurations may be used for the user 102 and certification authority 104.

In addition, although only a single user 102 and single certification authority 104 are shown in FIG. 1, it is to be appreciated that the present invention is readily applicable to systems which include multiple users, multiple certification authorities, or both. It should therefore be understood that the invention is more generally applicable to any number, type and arrangement of different client devices, servers or other information processing elements.

The term "computer" as used herein is intended to be construed generally so as to include any of the above-noted client devices, any of the servers, or combinations of one or more of the client devices and one or more of the servers.

The network 106 may be a local area network, a metropolitan area network, a wide area network, a global data communications network such as the Internet, a private "intranet" network, an "ad-hoc" network or any other suitable data communication medium, as well as portions or combinations of such networks or other communication media.

It should be understood that the terms "user" and "authority" as used herein are intended to include within their scope the respective entities as well as corresponding processing devices. For example, operations referred to herein as being performed by a user or an authority may be performed by an actual human user or a certification authority organization, respectively, by their associated processing devices, or by a combination of the actual entities and the associated processing devices.

Figure 2:
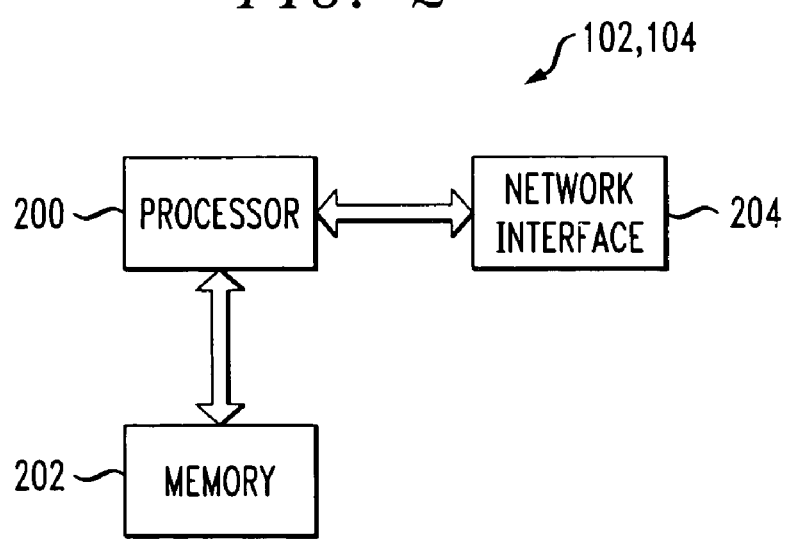
FIG. 2 is a block diagram of one possible implementation of a given one of the elements of the system of FIG. 1.

FIG. 2 shows one possible implementation of a given one of the client devices or servers of system 100. The implementation in FIG. 2 may thus represent one or more of the elements 102 and 104, as well as portions of these elements. This implementation includes a processor 200, a memory 202, and a network interface 204. One or more of the processing elements of system 100 may thus be implemented as a personal computer, a mainframe computer, a computer workstation, a smart card in conjunction with a card reader, or any other type of digital data processor as well as various portions or combinations thereof. The processor 200 may represent a microprocessor, a central processing unit, a digital signal processor, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 100.

The elements 102 and 104 of system 100 may be configured to execute software programs in accordance with the invention in order to generate and process certificates and related information in a manner to be described in detail below. The invention may be embodied in whole or in part in one or more software programs stored in one or more of the element memories, or in one or more programs stored on other machine-readable media associated with one or more of the elements of the system 100.

Example certificate generation techniques implementable at least in part in the system 100 of FIG. 1 using devices such as that shown in FIG. 2 will be described in detail below with reference to FIGS. 3, 4, 5 and 6.

More particularly, the present invention in the illustrative embodiments provides techniques for implementing what are denoted herein as "private certificates." A private certificate is one which is configured to eliminate or alleviate the previously-described problem of certificate lending. More particularly, a private certificate in the illustrative embodiments may be configured such that it is impossible for a given user to give away the rights associated with one certificate, without giving away the rights associated with a number of other certificates of that user. This feature ensures that the certificates are private to the owner. In addition, private certificates in the illustrative embodiments also maintain the privacy of the owner, in that the certificates cannot be correlated with one another, that is, are "unlinkable" without the knowledge of at least one of the corresponding secret keys. Advantageously, the private certificate techniques of the invention allow the generation of multiple unlinkable certificates, issued either by one or many certification authorities, for which different policies or other access rights can be associated.

In other words, the invention in the illustrative embodiments ensures that if a user gives away the secret key associated with one certificate, then that user in effect automatically gives away a different secret key associated with another certificate, while also ensuring that the certificates are unlinkable. Release of one secret key associated with one certificate thus automatically triggers the release of one or more other secret keys associated with other certificates.

The illustrative embodiments utilize either discrete logarithm based public key cryptography techniques, factoring-based public key cryptography techniques, or a combination of discrete logarithm based and factoring-based techniques. Example private certificate generation protocols using a discrete logarithm based public key cryptography technique will be described in conjunction with FIGS. 3 and 4. The discrete logarithm based technique is the well-known generalized ElGamal technique. An example private certificate generation protocol using a factoring-based public key cryptography technique will be described in conjunction with FIG. 5. The factoring-based technique in this example is the well-known RSA technique. An example private certificate generation protocol using a combination of discrete logarithm and factoring-based techniques will be described in conjunction with FIG. 6. It should be noted, however, that other public key cryptography techniques may be used to implement the invention. Moreover, the invention does not require the use of any particular certificate structure, and can be configured to operate with existing certificate generation techniques.

The characteristics of an example private certificate in accordance with the invention will now be described. Assume a user has a public key cryptography key pair (p, s) comprising a public key p and a secret key s, obtained using well-known conventional techniques. A private certificate can be generated by execution of a protocol between the user and the authority, e.g., the user 102 and the authority 104 of the system 100 of FIG. 1, such that at the end of the protocol:

1. The user obtains a new key pair $(\tilde{p}, \tilde{s})$ comprising a public key $\tilde{p}$ and a secret key $\tilde{s}$, where $(\tilde{p}, \tilde{s})$ is not necessarily generated using the same public key cryptography technique as that used in generating the original key pair (p, s). For instance, (p, s) could be an ElGamal key pair, while $(\tilde{p}, \tilde{s})$ could be an RSA key pair.

2. The authority issues certified data c to the user, that satisfies any one of the following properties:

(i) If one knows c and s, then one can recover s̃ in polynomial time. But the knowledge of c should not help in recovering s from s̃. In this case, the private certificate generation technique is said to be "out-asymmetric."

(ii) If one knows c and s̃, then one can recover s in polynomial time. But the knowledge of c should not help in recovering s̃ from s. In this case, the private certificate generation technique is said to be "in-asymmetric."

(iii) If one knows c, one can recover s from s̃ in polynomial time, and vice-versa.

In this case, the private certificate generation technique is said to be "symmetric."

3. An attacker cannot determine whether p and p̃ belong to the same user, that is, the attacker is not able to distinguish, with non-negligible advantage, the pair of public keys (p, p̃) from a pair of public keys randomly generated using the corresponding public key cryptography techniques, even knowing the certified data c. The public keys p and p̃ are thus said to be "unlinkable," that is, they cannot be correlated with one another.

Public keys that are unlinkable or not correlatable to one another as those terms are used herein should be broadly construed so as to include without limitation public keys that if processed using practical levels of computational resources appear substantially no more related to one another than would randomly-generated public keys processed in a similar manner.

Secret keys that are referred to herein as being "not determinable" from one another or "not recoverable" from one another are intended to include those situations in which a particular secret key cannot be discovered from another secret key in polynomial time, as well as other situations in which it is computationally infeasible or otherwise very difficult to recover the particular secret key from another secret key using practical levels of computational resources.

As noted above, the discrete logarithm based public key cryptography technique in the illustrative embodiments is the well-known generalized ElGamal public key cryptography technique. In a generalized ElGamal cryptosystem, a user selects a secret key $x \in Z^*_q$ and computes $y=g^x$, where g is a generator of a cyclic group G of order q. The public key is given by (g, y). To encrypt a message $m \in G$, the user selects a random integer $k \in Z^*_q$. The ciphertext is $(g^k, m \cdot y^k)$, which is also denoted herein as $EGE_{g,y}(m)$. To decrypt a ciphertext (c, d), one computes $m=d/c^x$, which is also denoted herein as $EGD_x(c, d)$. Additional details can be found in the above-cited A. J. Menezes et al. reference.

The ElGamal cryptosystem is semantically secure if the group G satisfies the Decision Diffie-Hellman assumption, which is described in, e.g., D. Boneh, "The Decision Diffie-Hellman Problem," Proc. of the ANTS-III, LNCS Vol. 1423, Springer-Verlag, 1998, which is hereby incorporated by reference herein.

A useful property of the ElGamal cryptosystem is its multiplicativity, that is, if $m_1$ and $m_2$ are in G, and $(c_i, d_i)=EGE_{g,y}(m_i)$ for $1 \leq i \leq 2$, then $EGD_x(c_1 c_2, d_1 d_2)=m_1 m_2$.

It is also possible to obtain chosen-ciphertext security based on the random oracle model, using known ElGamal variants including those described in E. Fujisaki et al., "Secure Integration of Asymmetric and Symmetric Encryption Schemes," Proc. of Crypto '99, LNCS Vol. 1666, IACR, Springer-Verlag, 1999, and D. Pointcheval, "Chosen-Ciphertext Security for Any One-Way Cryptosystem," Proc. of PKC 2000, LNCS Vol. 1751, Springer-Verlag, 2000, which are hereby incorporated by reference herein.

Figure 3:
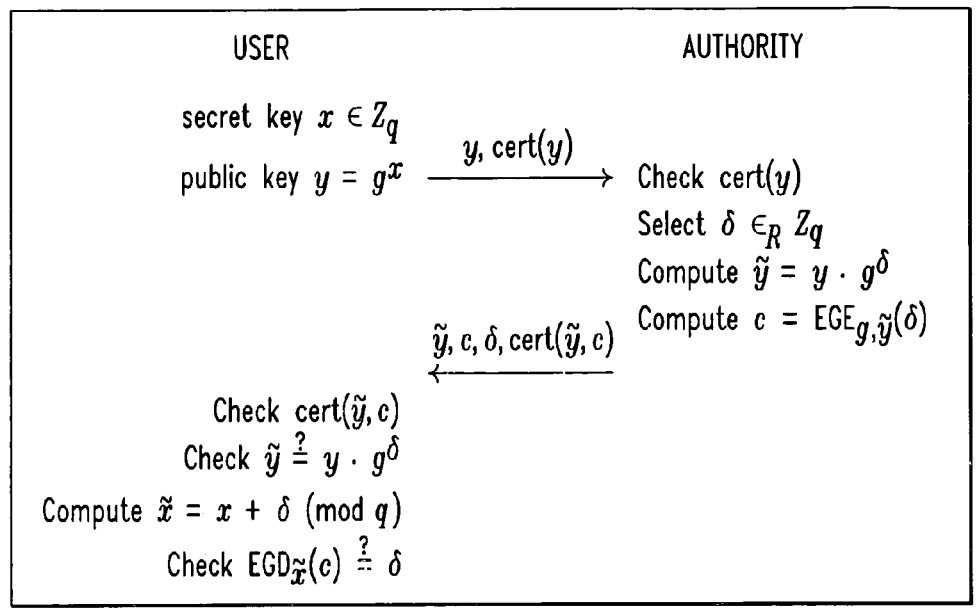
FIGS. 3, 4, 5 and 6 show example private certificate generation protocols suitable for use in the FIG. 1 system in accordance with the invention.

With reference now to FIG. 3, an example of an in-asymmetric private certificate generation protocol based on generalized ElGamal public key cryptography is shown. Assume that the user has a secret key $x \in Z_q$ corresponding to the public key $y=g^x$, where g is a generator of a group G of order q.

The user and the authority establish a private channel using known techniques. The term "private channel" as used herein should be understood to include, by way of example and not limitation, any communication channel, such as a channel established over the network 106 in FIG. 1, that is configured so as to provide acceptable levels of security for a given communication or series of communications in a particular application. It should be noted that in general every communication associated with a given private certificate generation protocol in accordance with the invention need not necessarily be carried out over a private channel, as will be readily apparent to those skilled in the art.

The user sends its public key y and its certificate on y, denoted cert(y), to the authority. The authority checks cert(y), selects a random δ in $Z_q$, and computes $ỹ=y \cdot g^δ$ and $c=EGE_{g,ỹ}(δ)$. The user receives from the authority ỹ, c, δ and a certificate on ỹ and c, denoted cert(ỹ, c). The user checks cert(ỹ, c) and the equality $ỹ=y \cdot g^δ$. The user then computes $x̃=x+δ \pmod q$, which is the new secret key. This secret key corresponds to the public key $ỹ=g^{x̃}$. Finally, the user checks the consistency of c, through the equality $EGD_{x̃}(c)=δ$. Clearly, if one knows c and x̃, then one can recover x in polynomial time by first decrypting c into δ, and then computing $x=x̃-δ \pmod q$. However, the knowledge of c does not provide significant assistance in recovering x̃ from x. In addition, it can be shown that if the underlying discrete logarithm based cryptography technique is secure, in this case the generalized ElGamal cryptography technique, then the resulting public keys and the corresponding certificates are unlinkable.

An unlinkable out-asymmetric private certificate generation protocol can be generated from the previously-described in-asymmetric protocol. For example, one can simply replace $c=EGE_{g,ỹ}(δ)$ by $c=EGE_{g,y}(δ)$. Then the user has to check that $EGD_x(c)=δ$ instead of $EGD_{x̃}(c)=δ$ at the end of the protocol.

Figure 4:
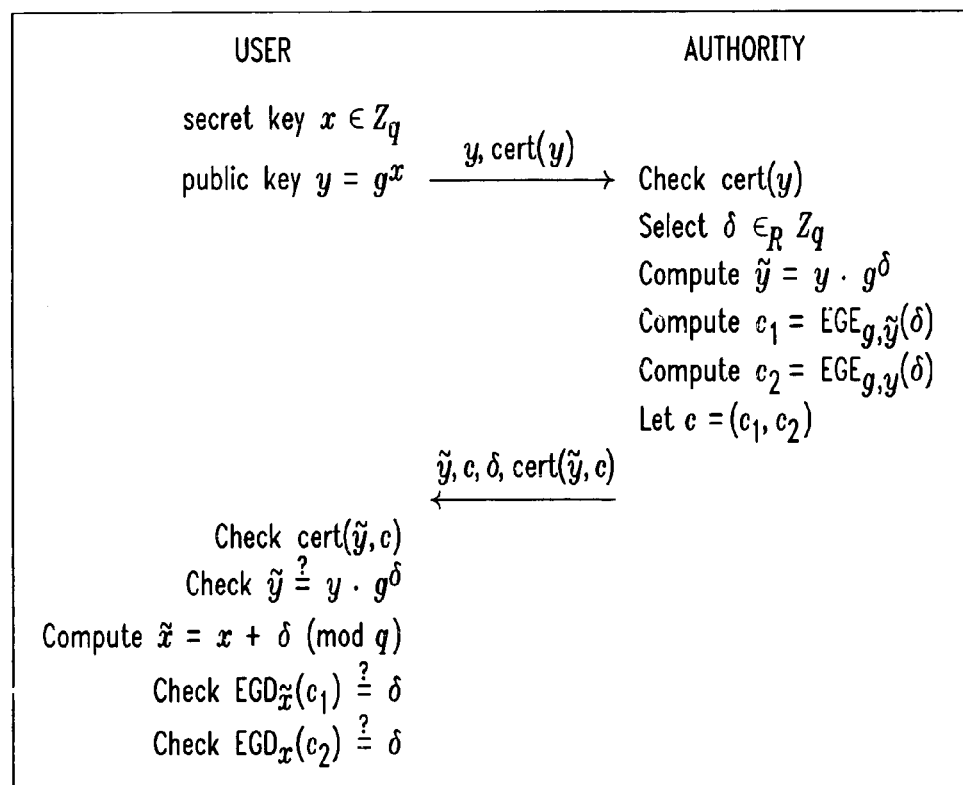

A symmetric private certificate generation protocol can be obtained by combining the two asymmetric protocols previously described. Such a protocol is shown in FIG. 4. In this case, the authority communicates both $c_1=EGE_{g,ỹ}(δ)$ and $c_2=EGE_{g,y}(δ)$ to the user, as indicated, and the protocol is adjusted accordingly.

Figure 5:
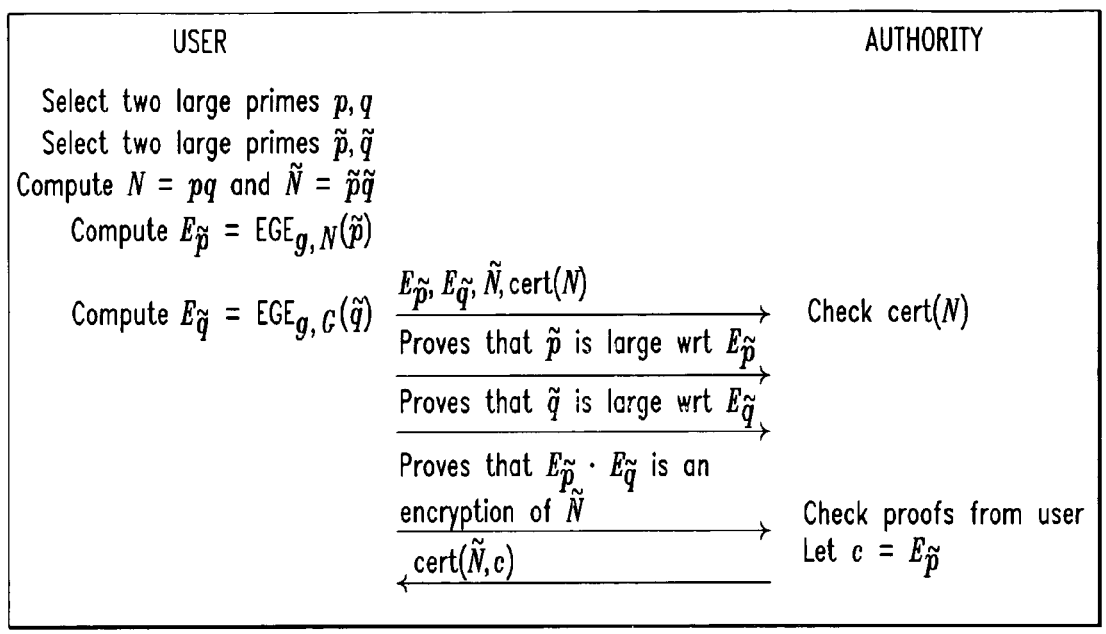

Referring now to FIG. 5, an in-symmetric private certificate generation protocol is shown for a factoring-based public key cryptography technique, namely, the well-known RSA technique. The RSA technique is described in greater detail in the above-cited A. J. Menezes et al. reference. The user selects a first secret key comprising two large primes (p, q), and a second secret key comprising two large primes (p̃, q̃). The user computes the products $N=pq$ and $Ñ=p̃q̃$, which denote the corresponding public keys. The user selects a public element $g \in Z^*_N$. The user also selects an ElGamal secret key x corresponding to the group $Z^*_N$, associated with the public key $y=g^x \pmod N$. The user then computes two ElGamal ciphertexts, namely, $E_{p̃}=EGE_{g,N}(p̃)$ and $E_{q̃}=EGE_{g,N}(q̃)$. The user and the authority establish a private channel using known techniques. The user sends $E_{p̃}$, $E_{q̃}$, Ñ, and a certificate denoted cert(N) to the authority over the private channel. The authority checks the certificate. The user then proves to the authority that p̃ and q̃ are large with respect to the encryptions $E_{p̃}$ and $E_{q̃}$, respectively, using a protocol such as that described in F. Boudot, "Efficient Proofs that a Committed Number Lies in an Interval," Proc. of Eurocrypt 2000, LNCS Vol. 1807, IACR, Springer-Verlag, 2000, which is hereby incorporated by reference herein. In other words, the user proves in zero-knowledge that both p̃ and q̃ fall in prescribed intervals, using the commitments $E_{p̃}$ and $E_{q̃}$ on p̃ and q̃, respectively. The user also proves to the authority that the product of $E_{p̃}$ and $E_{q̃}$ is an encryption on Ñ, which can be done in a straightforward manner using techniques known in the art. The authority then checks the proofs from the user, and the certified data c is set to $E_{\tilde{p}}$. Alternatively, the certified data c can be set to $E_{\tilde{q}}$, or to a combination or other function of $E_{\tilde{p}}$ and $E_{\tilde{q}}$. The authority then generates a new certificate denoted cert (N, c) and sends it to the user, thereby completing the example private certificate generation protocol.

Figure 6:
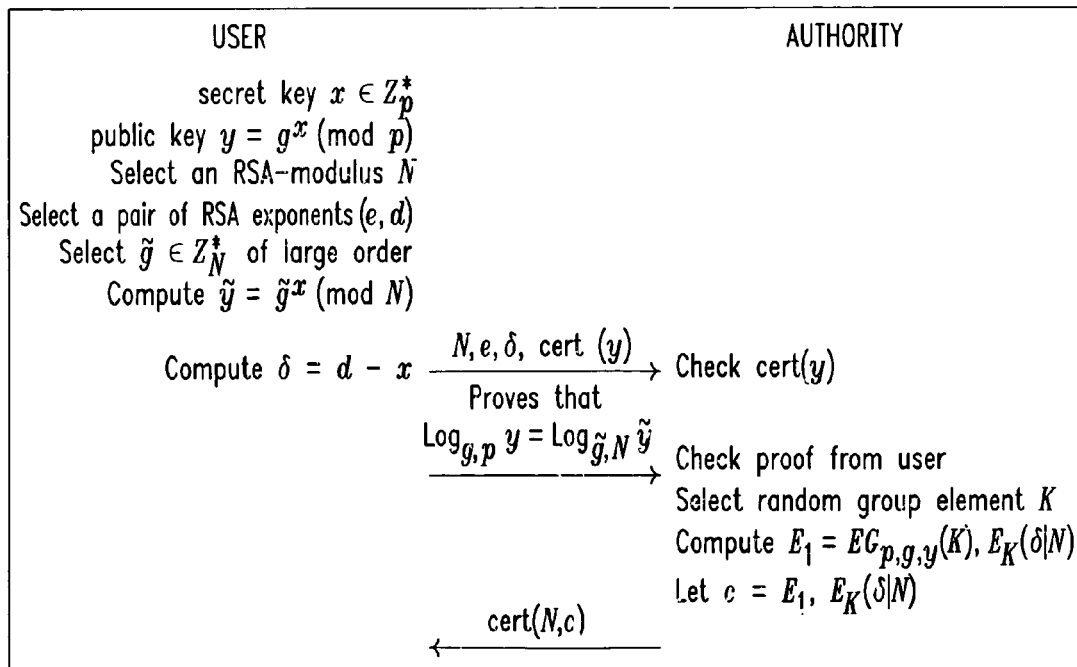

FIG. 6 shows an example private certificate generation protocol for a hybrid case in which the first key pair is a discrete logarithm based key pair and the second key pair is a factoring-based key pair. Assume that the user has a discrete logarithm based secret key $x \in Z^*_p$ corresponding to the public key $y=g^x \pmod p$. To create an additional factoring-based key, the user first selects an RSA modulus N, together with a pair of RSA exponents (e, d) where e is the public exponent, and d the secret one. The user also selects an element $g \in Z^*_N$ Of large order, and computes $\tilde{y}=\tilde{g}^x \pmod N$ and $\delta=d-x$. The user sends N, e, $\delta$, and a certificate on the public key y, the latter denoted cert (y), to the authority over a private channel. The authority checks the certificate. The user then proves to the authority that $$\log_{g,p} y = \log_{\tilde{g},N} \tilde{y},$$

using an approach such as that described in J. Camenisch et al., "Proving in Zero-Knowledge That a Number is the Product of Two Safe Primes," Proc. of Eurocrypt '99, LNCS Vol. 1592, pp. 107-122, IACR, Springer-Verlag, 1999, which is hereby incorporated by reference herein. The authority checks this proof from the user. The authority then selects a random group element K, and computes $$E_1 = EG_{p,g,y}(K), E_K(\delta|N).$$

The authority then sets the certified data c to the pair $E_1$, $E_K(\delta|N)$, and generates a new certificate denoted cert(N, c) which is sent to the user.

As noted above, the invention can be implemented in an asymmetric protocol, such that knowledge of one secret key allows the computation of a second secret key, while knowledge of the second secret key would not allow the computation of the first secret key. It is also possible to implement a private certificate generation protocol in which a certain set of secret keys has to be known in order to compute another set of secret keys, and this type of protocol could be either symmetric or asymmetric. Such a protocol can be implemented through straightforward modification of the protocols described in conjunction with FIGS. 3, 4, 5 and 6.

The above-described embodiments of the invention are illustrative only. Numerous alternative embodiments within the scope of the appended claims will be readily apparent to those skilled in the art. For example, the invention can be implemented using public key cryptography techniques other than the discrete logarithm based and factoring based techniques used in the illustrative embodiments. In addition, other certificate formats may be used, as appropriate for the particular needs of a given application. Furthermore, the invention can be applied to other types of information processing systems and corresponding arrangements of client and server devices. The particular information processing operations utilized in a given embodiment may vary depending upon application-specific factors such as the configuration and capabilities of the client and server devices, the network connections used, etc.

We claim:

1. A method of generating a certificate for use in cryptographic applications, the method comprising the steps of:
receiving a first certificate on a first public key, the first public key having a corresponding first secret key;
receiving additional cryptographic information other than the first public key, the additional cryptographic information being generated at least in part using at least a portion of at least one of the first secret key and a second secret key: and
generating based on the additional cryptographic information a second certificate on a second public key, the second public key having the second secret key as its corresponding secret key;
wherein the second certificate comprises certified cryptographic information that makes it computationally feasible for one in possession of a given one of the first and second secret keys to derive from that secret key the other of the first and second secret keys, such that a first user rightfully in possession of the first and second secret keys and the respective first and second certificates cannot lend the given secret key and its corresponding certificate to a second user without also making the other secret key accessible to the second user; and
wherein it is computationally infeasible for an attacker knowing the certified cryptographic information to correlate the first and second public keys.

2. The method of claim 1, wherein at least one of the certificates comprises a data part including in plaintext format the corresponding public key and a subject entity identifier, and a signature part comprising a digital signature by a certification authority on the data part.

3. The method of claim 1, wherein a first key pair comprising the first public key and the first secret key is generated using a public key cryptography technique, and a second key pair comprising the second public key and the second secret key is generated using the public key cryptography technique.

4. The method of claim 3, wherein the public key cryptography technique comprises a discrete logarithm based public key cryptography technique.

5. The method of claim 4, wherein the discrete logarithm based public key cryptography technique comprises a generalized ElGamal public key cryptography technique.

6. The method of claim 3, wherein the public key cryptography technique comprises a factoring-based public key cryptography technique.

7. The method of claim 6, wherein the factoring-based public key cryptography technique comprises an RSA public key cryptography technique.

8. The method of claim 1, wherein a first key pair comprising the first public key and the first secret key is generated using a first public key cryptography technique, and a second key pair comprising the second public key and the second secret key is generated using a second public key cryptography technique different than the first public key cryptography technique.

9. The method of claim 8, wherein the first public key cryptography technique comprises one of a discrete logarithmic based public key cryptography technique and a factoring-based public key cryptography technique, and the second public key cryptography technique comprises one of a discrete logarithmic based public key cryptography technique and a factoring-based public key cryptography technique.

10. The method of claim 1, wherein the seesfid generating step comprises generating n-1 certificates, each having a corresponding secret key associated therewith, such that given a secret key associated with any one of the n certificates, the secret keys associated with the remaining ones of the n certificates are recoverable from the given secret key in polynomial time.

11. The method of claim 1, wherein the generating step comprises generating n-1 certificates, each having a corresponding secret key associated therewith, such that given a set of secret keys each associated with a corresponding certificate in a designated subset of the n certificates, the secret keys associated with another subset of the n certificates are recoverable from the given set of secret keys in polynomial time.

12. The method of claim 1, wherein the generating step is implemented using an asymmetric certificate generation protocol such that the second secret key can be determined from the first secret key but the first secret key cannot be determined from the second secret key.

13. The method of claim 1, wherein the generating step is implemented using a symmetric certificate generation protocol such that the second secret key can be determined from the first secret key and the first secret key can be determined from the second secret key.

14. A method of generating a certificate for use in cryptographic applications, the method comprising the steps of:
   receiving a first certificate on a first public key, the first public key having a corresponding first secret key; and
   generating a second certificate on a second public key, the second public key having a corresponding second secret key;
   wherein the second certificate comprises certified cryptographic information that makes it computationally feasible for one in possession of a given one of the first and second secret keys to derive from that secret key the other of the first and second secret keys, such that a first user rightfully in possession of the first and second secret keys and the respective first and second certificates cannot lend the given secret key and its corresnonding certificate to a second user without also making the other secret key accessible to the second user; and
   wherein it is computationally infeasible for an attacker knowing the certified cryptographic information to correlate the first and second public keys.

15. An apparatus for generating a certificate for use in cryptographic applications, the apparatus comprising:
   a processor-based client device adapted for connection via a network to one or more servers of an information processing system, the client device being operative:
   to transmit to a certification authority a first certificate on a first public key, the first public key having a corresponding first secret key:
   to transmit to the authentication authority additional cryptographic information other than the first public key. the additional cryptographic information being generated at least inpart using at least a portion of at least one of the first secret key and a second secret key; and
   to receive from the authentication authority a second certificate on a second public key, the second public key having the second secret key as its corresponding secret key, the second certificate being generated based on the additional cryptographic information;
   wherein the second certificate comprises certified cryptographic information that makes it computationally feasible for one in possession of a given one of the first and second secret keys to derive from that secret key the other of the first and second secret keys, such that a first user rightfully in possession of the first and second secret keys and the respective first and second certificates cannot lend the given secret key and its corresponding certificate to a second user without also making the other secret key accessible to the second user; and
   wherein it is computationally infeasible for an attacker knowing the certified cryptographic information to correlate the first and second public keys.

16. An apparatus for generating a certificate for use in cryptographic applications, the apparatus comprising:
   a set of one or more servers adapted for connection via a network to one or more client devices of an information processing system, the one or more servers being operative:
   to receive a first certificate on a first public key, the first public key having a corresponding first secret key;
   to receive additional ervoto graphic information other than the first public key, the additional cryptographic information being generated at least in pad using at least a portion of at least one of the first secret key and a second secret key;
   to generate based on the additional cryptographic information a second certificate on a second public key, the second public key having the second secret key as its corresponding secret key;
   wherein the second certificate comprises certified cryptographic information that makes it computationally feasible for one in possession of a given one of the first and second secret keys to derive from that secret key the other of the first and second secret keys, such that a first user rightfully in possession of the first and second secret keys and the respective first and second certificates cannot lend the given secret key and its corresponding certificate to a second user without also making the other secret key accessible to the second user; and
   wherein it is computationally infeasible for an attacker knowing the certified cryptographic information to correlate the first and second public keys.

17. An article of manufacture comprising one or more software programs for generating a certificate for use in cryptographic applications, wherein the one or more software programs when executed by one or more processor-based devices of an information processing system implement the steps of:
   receiving a first certificate on a first public key, the first public key having a corresponding first secret key;
   receiving additional cryptographic information other than the first public key, the additional cryptographic information being generated at least in part using at least a portion of at least one of the first secret key and a second secret key;
   generating based on the additional cryptographic information a second certificate on a second public key. the second public key having the second secret key as its corresponding secret key;
   wherein the second certificate comprises certified cryptographic information that makes it computationally feasible for one in possession ofKgiven one of the first and second secret keys to derive from that secret key the other of the first and second secret keys, such that a first user rightfully in possession of the first and second secret keys and the respective first and second certificates cannot lend the given secret key and its corresponding certificate to a second user without also making the other secret key accessible to the second user; and
   wherein it is computationally infeasible for an attacker knowing the certified cryptographic information to correlate the first and second public keys.

* * * * *

UNITED STATES PATENT AND TRADEMARK OFFICE
CERTIFICATE OF CORRECTION

PATENT NO. : 7,404,078 B2
APPLICATION NO. : 10/180786
DATED : July 22, 2008
INVENTOR(S) : B. M. Jakobsson et al.

It is certified that error appears in the above-identified patent and that said Letters Patent is hereby corrected as shown below:

On the title page item (56), line 1, after "al." insert --,-- and delete all boxes before "Handbook" and insert --"--.

On the title page item (56), line 2, after "Cryptography" insert --,"-- and delete all boxes, after "1997" insert --,-- and after "Press" insert --,--.

Signed and Sealed this

Thirty-first Day of March, 2009

JOHN DOLL
*Acting Director of the United States Patent and Trademark Office*